United States Patent [19]

Kanbar et al.

[11] 3,876,294

[45] Apr. 8, 1975

[54] LENSLESS OPHTHALMIC DEVICE

[76] Inventors: Maurice S. Kanbar, 34 W. 13th St., New York, N.Y. 10011; Herbert A. Knapp, 600 Third Ave., Bradley Beach, N.J. 07720

[22] Filed: Aug. 17, 1973

[21] Appl. No.: 389,111

Related U.S. Application Data

[63] Continuation-in-part of Ser. No. 214,980, Jan. 3, 1972, abandoned.

[52] U.S. Cl. ............................. 351/46; 351/63
[51] Int. Cl. .............. G02c 7/16; G02c 5/08
[58] Field of Search ............................. 351/46, 63

[56] References Cited
UNITED STATES PATENTS

| | | | |
|---|---|---|---|
| 564,518 | 7/1896 | Heilborn | 351/46 |
| 2,975,426 | 3/1961 | Rabb | 351/63 X |
| 3,507,566 | 4/1970 | Knapp | 351/46 X |

FOREIGN PATENTS OR APPLICATIONS

| | | | |
|---|---|---|---|
| 398,850 | 6/1909 | France | 351/46 |

OTHER PUBLICATIONS

Judith Merrill, Popular Mechanics, Nov. 1964, "Tel-Specs."

*Primary Examiner*—Paul A. Sacher

[57] ABSTRACT

A lensless ophthalmic device serving as a temporary or emergency substitute for any type of prescription eyeglasses, making it possible for most individuals having defective sight, without regard to the optical nature of the defect, to see clearly. The device is constituted by a molded plate having a profile defining a pair of eyepieces joined to a nose piece, each eyepiece having a pattern of pin holes therein adapted to project a clear image of the object viewed on the related eye of the wearer, the pin holes being treated to obviate corona effects. The spacings between holes in the pattern is such that when the plate is placed against the eyes, the eye is unable to resolve the hole pattern and the holes in each eyepiece appear to merge to form one large opening.

5 Claims, 6 Drawing Figures

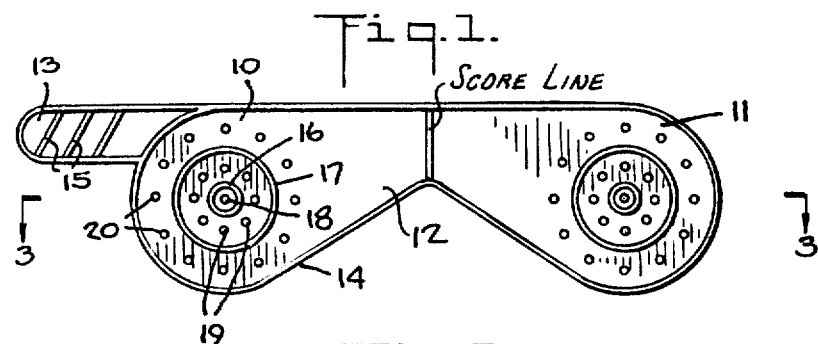
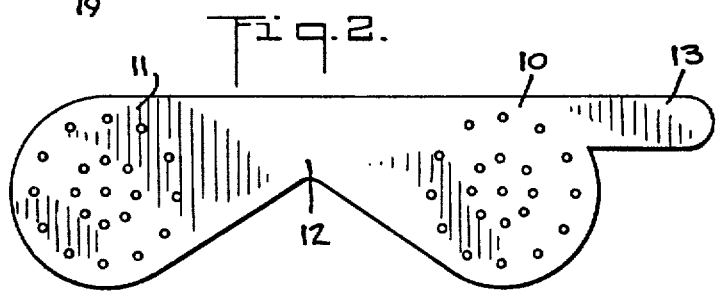
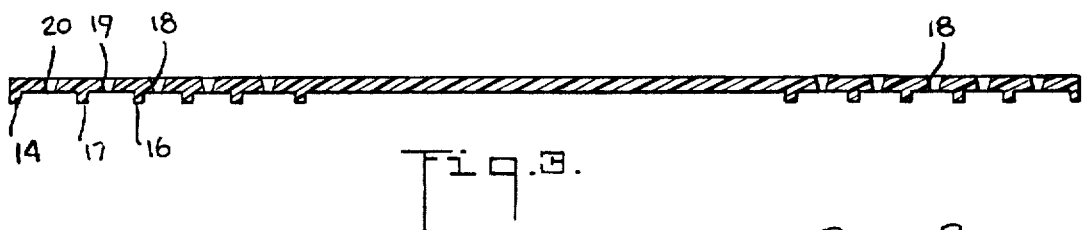
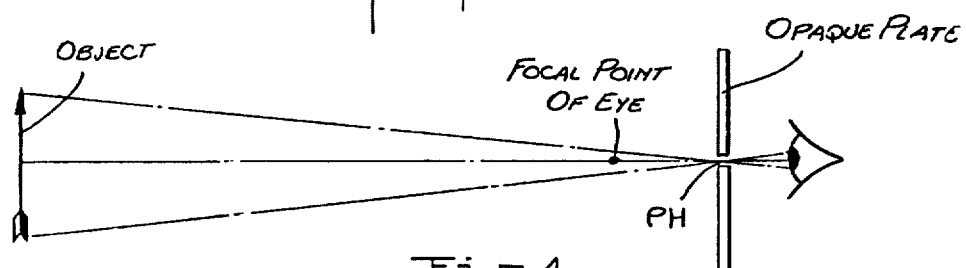
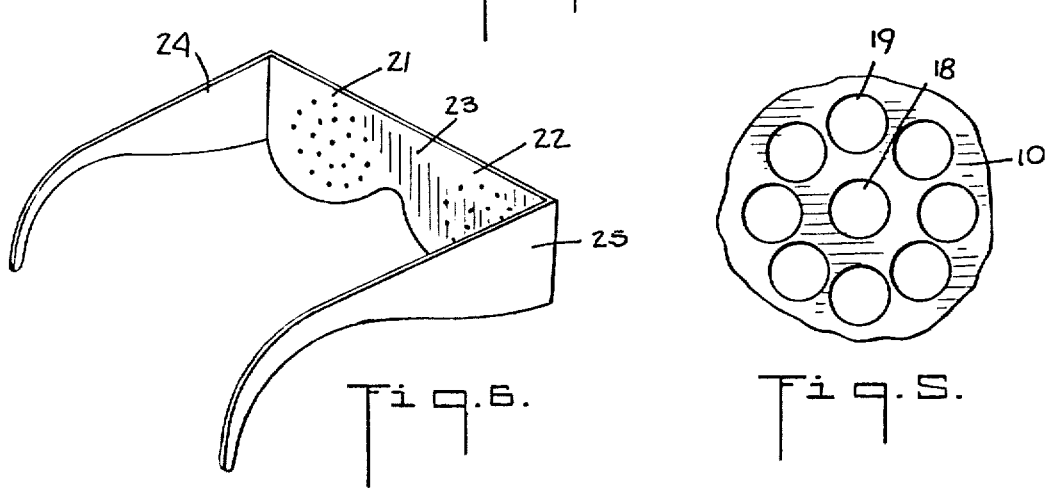

LENSLESS OPHTHALMIC DEVICE

RELATED APPLICATION

This application is a continuation-in-part of our co-pending application Ser. No. 214,980 filed Jan. 3, 1972, now abandoned.

BACKGROUND OF THE INVENTION

The invention relates generally to ophthalmic devices, and more particularly to a lensless lorgnette serving as a temporary or emergency substitute for any type of prescription eyeglasses, making it possible for an individual having defective sight, without regard to the optical nature of his defect, to see clearly.

Eyeglasses or spectacles consist of a pair of lenses mounted in a frame to hold them in a position before the eyes to aid or correct defective sight. The lenses are made of clear or rock crystal glass or plastic, such as acrylic material, optically ground to suit the defect of the associated eyes. Concave lenses are used for near-sightedness so that the rays of light are caused to diverge. In the case of far-sightedness, convex lenses are employed so that the light rays are converged. Astigmatism is remedied by cylindrical lenses. Bifocal lenses with a lower part for viewing objects near at hand, as in reading, were first devised by Benjamin Franklin.

Since optically incorrect eyeglasses may do harm, it is important that the lenses be prescribed and fitted by a skilled optometrist or ophthalmologist. Thus, the typical eyeglass wearer carries on his person one or more pairs of spectacles whose lenses are specifically designed for correcting the eye defects of the wearer. Many wearers have very poor vision without their eyeglasses, so that should they misplace or break them, they are unable to read or to perceive objects at a distance, depending on the nature of their eye defect. For example, some persons wishing to read a menu or consult a telephone directory are at a total loss should they not have their spectacles at hand. This is often a source of great difficulty or inconvenience, for spectacle lenses are prescribed and one cannot usually function with a borrowed pair.

When spectacle lenses are accidentally broken or cracked and require replacement, this is a matter which may take several days. As a consequence, the wearer during the waiting period is seriously handicapped unless he has another pair available. The loss or destruction of prescription eyeglasses is a common experience which frequently takes place when one is least able to remedy the situation, such as on Sundays or holidays when optometrists are not available, or on a vacation in places where replacement eyeglasses cannot be obtained.

SUMMARY OF THE INVENTION

In view of the foregoing, it is the main object of this invention to provide a simple, universal viewing device having no lenses and functioning as a temporary substitute for any type of prescription eyeglasses, making it possible for almost any user having defective sight to see clearly.

More particularly, it is an object of this invention to provide a one-piece lensless lorgnette in the form of a unitary plate, profiled to define a pair of eyepieces joined together by a nose piece, with a handle projecting from one of the eyepieces, each eyepiece having an array of pin holes therein in a pattern adapted to project a clear image of the object viewed on the related eye of the user.

A significant advantage of the invention is that any ordinary wearer of prescription eyeglasses, regardless of his head shape, or the distance between his eyes and the nature of his eye defects, is able to see near and far objects with an acceptable degree of clarity. While the lensless device does not afford optical correction specifically correlated to the defects of the user's eyes, the images produced thereby are sufficiently focused for emergency purposes, so that the user is at least able to read a telephone directory, to see street signs and to function reasonably well without eyeglasses.

The value of the temporary device is greatest for those individuals whose uncorrected vision is so poor that in the absence of glasses, they almost have to feel their way. With a temporary ophthalmic device in accordance with the invention, adequate vision is restored. The device is not necessarily a temporary substitute for prescription glasses, for in many undeveloped or poverty-striken countries where very few persons can afford prescription lenses, the device may be distributed at very low cost to individuals in need of a visual aid, such as elderly persons who are barely able to recognize others.

Because a lensless ophthalmic device in accordance with this invention may be mass-produced at low cost, simply by molding a high grade, high strength plastic material into the desired form, the devices may be packaged in sterile condition in envelopes and treated as a disposable item which may be discarded after having served its temporary purpose. Thus, restaurants, post offices and other establishments can lay in a supply of these items for the convenience of their clientele.

Yet another object of the invention is to provide a lensless ophthalmic device which not only serves to improve vision, but also acts to protect the wearer from sun and glare.

Because the lensless device is constituted by an opaque plate having pin holes therein, the amount of light admitted to the eyes is far below the level passing through untinted lenses. In this regard, the device is similar to the wooden "eyeglasses" made and used by Eskimos with a narrow slit for eyepieces to protect the eyes from glare reflected by ice and snow. However, a slitted eye protector as traditionally used by Eskimos and now by skiers, does not also function to enhance the clarity of objects being viewed, whereas the present invention performs this dual function.

Briefly stated, these objects are attained in an ophthalmic device constituted by a molded plate of opaque material profiled to define a pair of eyepieces joined together by a nose piece. Formed in each eyepiece is an array of pin holes preferably in orbital patterns, each pin hole acting to focus the object being viewed on the eye to produce a clear image thereof. The spacing between the holes in each orbit and between the holes of adjacent orbits is such that when the eyepiece is placed adjacent the eye, the eye is not capable of resolving the orbital pattern of holes, and the separated holes appear almost to merge to form one large opening.

Some degree of collimation and reduced admission of oblique rays is effected by ridges on the plate surrounding the orbits of holes. To minimize corona or halo effects, the pin holes are countersunk to minimize the length of the bases or the surface of the bases is given a matte finish to minimize internal reflection. To facilitate manipulation, the plate is formed with a handle projecting from one of the eyepieces whereby the device may be conveniently handled as a lorgnette. One may also add temple pieces to the plate so that it may be worn.

OUTLINE OF THE DRAWING

For a better understanding of the invention, as well as other objects and further features thereof, reference is made to the following detailed disclosure to be read in conjunction with the accompanying drawing wherein:

FIG. 1 is a front view of a lorgnette in accordance with the invention;

FIG. 2 is a rear view of the same lorgnette;

FIG. 3 is a longitudinal section taken in the plane indicated by lines 3—3 in FIG. 1;

FIG. 4 is a sketch illustrating the optical function of a single pin hole;

FIG. 5 is a sketch showing the effect of multiple pin holes on the eye of the wearer; and FIG. 6 is a perspective view of a device according to the invention provided with temple pieces.

DESCRIPTION OF THE INVENTION

Referring now to FIGS. 1, 2 and 3, there is shown a preferred embodiment of an ophthalmic device in accordance with the invention. The device is constituted by a plate molded of high-grade, high strength plastic material, such as styrene, polypropylene or high impact nylon, the profile of the plate defining a pair of generally circular eyepieces 10 and 11 joined together by a nose piece 12 adapted to rest on the nose bridge of the user. Extending from the right eyepiece is a handle 13. In practice, the plastic plate may be metallized with aluminum, nickel or any other attractive metal.

The surface of the plate placed against the eyes of the wearer is perfectly smooth, as shown in FIG. 2, whereas the surface of the other side of the plate facing away from the wearer is embossed or ridged in the manner shown in FIG. 1.

The entire plate is provided with a peripheral ridge 14. The handle 13 is formed with a series of spaced ridges 15 to prevent slippage. Each eyepiece is provided with a central circular ridge 16 and an intermediate circular ridge 17 concentric with the central ridge. The peripheral ridge 14 which follows the circular curvature of the eyepiece, constitutes the outer ridge of each eyepiece.

Placed at the axis of the circular zone surrounded by center ridge 16 is a single pin hole 18. Placed within the annular zone entirely surrounded by circular ridge 17 is a circular orbit of eight equi-spaced pin holes 19. And placed within the annular zone partially surrounded by peripheral ridge 14 is a circular orbit of twelve equi-spaced pin holes 20.

The diameter of each pin hole is in the order of a few thousandths of an inch to afford a camera-obscura effect, as illustrated in FIG. 4. Ordinarily, the naked eye acts as an adjustable lens to focus an image of the near or distant object onto the retina, the eye lens adjusting itself to the distance between the object and the eye. If the eye is defective, its lens is incapable of properly focusing a well-defined image on the retina. Hence the purpose of an eyeglass lens is to act in combination with the eye lens in a manner compensating for or correcting the eye lens defect, whereby a well-defined image is produced on the retina.

When instead of a corrective lens, a pin hole PH is placed very close to the eye, all rays emerging from the object being viewed must meet and pass through the minute hole; hence the pin hole acts as a point of focus. Because this focusing point on the plate is very close to the eye, the eye lens cannot act to focus on the object being viewed, but passes the image focused by the pin hole onto the retina.

Thus, what the retina senses is not the poorly focused image produced by the eye lens (assuming defective vision), but the better focused image produced by the pin hole. This optical effect is made evident if one moves the pin hole away from the eye, for while one can still see through the hole, the eye is then able to function normally and if its lens is defective, the image seen through the pin hole is only that which the eye is capable of seeing without correction.

But the moment the pin hole is brought directly adjacent the eye, the image is brought into focus, for the pin hole is situated between the focal point of the eye lens and the eye itself. In other words, the focal point of the eye lens is behind the opaque plate and is blocked thereby so that the eye directly in front of the plate sees only the rays focused thereon by the pin hole.

Because a single pin hole admits relatively little light, in order to produce an adequately bright image, a pattern of holes is employed, with sufficient spacing therebetween so that each hole still functions independently as a focusing element. The multiple-hole pattern is larger than the normal eye, hence if eyepieces 10 and 11 were both in proper registration with each eye of the wearer, the outer orbit of holes 20 would be outside the field of vision.

However, the universal device is intended for all persons regardless of head size and eye spacing. Hence, where the eyes of the wearer are very close together, the eyepieces 10 and 11 may be somewhat off center with respect to the eyes, in which event the outer ring of holes becomes important, for viewing is then in good part through those holes in the outer rings which are nearest to nose piece 12.

When the device is worn, the pin holes are close to the eyes, hence the eyes are unable to resolve these holes and instead of seeing separated holes as in the pattern formation shown in FIGS. 1 and 2, the spacing between holes in each orbit and between holes in adjacent orbits is such that the several holes, as shown in FIG. 5, appear to fuse or merge. While the effect is still grid-like, the connecting webs of the grid are thin whereas the pin holes are enlarged and close together. Consequently, the pattern of pin holes, when close to the eye, is more like a multiple-paned window which does not obstruct vision.

In the lorgnette arrangement shown in FIGS. 1 to 3, the device is held by a handle. Where, as shown in FIG. 6, the device is to be used as a lensless sun protector which functions to reduce sun and glare and improve vision, instead of a handle, the plate which is provided with two eyepieces 21 and 22 and nose piece 23 is also provided with temple pieces 24 and 25 hinged to eyepieces 21 and 22.

In practice, the plate and the temple pieces may be molded integral with each other, with thinned junction areas therebetween functioning as hinges. This is readily done with such flexible materials as polypropylene.

While there have been shown and described preferred embodiments of a Lensless Ophthalmic Device in accordance with the invention, it will be appreciated that many changes and modifications may be made therein without, however, departing from the essential spirit of the invention. For example, the hole pattern need not be orbital and may be formed by any array of spaced holes, as long as the hole diameter produces a focusing effect and the spacing between holes is such as to cause the holes to merge into one large opening when the eyepiece is directly against the eye. A large plate containing pin holes as disclosed above may be used as a separating panel between a room and an observation chamber. Thus, activity taking place in the room may be observed clearly without detection through the panel. This is useful in psychological experimentation.

In order to make a lorgnette of acceptable strength, the unitary plastic plate from which it is formed, must be reasonably thick. Otherwise the plate is readily bendable, which is not desireable. As a consequence the pin holes are constituted by relatively long bases or tunnels in the plate. When these tunnels have smooth walls, this gives rise to internal multiple reflection which under certain ambient lighting conditions, produces undesireable corona or halo effects. The presence of holes about each pin hole interferes with proper vision.

To obviate corona effects one may countersink each pin hole so that the effective thickness of the pin hole is very thin, and because of the taper produced by the countersink, multiple internal reflection is minimized. Or one may treat the internal surface of the tunnel to avoid internal reflection. This can be done by roughening the steel molding pins, as by sandblasting, so as to impart a matte, rather than a smooth finish to the base tunnels.

A foldable lorgnette may be made by providing a unitary plastic plate having pin holes therein, the center or nose-piece portion of the plate having a transverse score line thereacross to define a hinge, making it possible to fold the lorgnette in half, and to store the folded lorgnette in a compact case. This score line is made in the molding operation, the center portion of the plate being preferably made relatively thin to facilitate bending on the score line.

We claim:

1. A lensless one-piece lorgnette serving as a temporary substitute for any type of prescription eyeglasses, making it possible for most individuals having defective sight, without regard to the optical nature of their defect to hold the lorgnette before their eyes to see clearly; said device comprising an opaque plate fabricated from a unitary molded plate of high strength plastic material and having a profile defining a pair of eyepieces joined to a nose piece and a handle integral with one of said eyepieces, the opaque plate portion constituting each eyepiece having a pattern of pin holes formed therein projecting a clear image of the object being viewed on the related eye of the wearer when the plate is placed on the nose bridge against the eyes of the wearer, the spacing between pattern holes being such that the eye cannot resolve the holes so that the holes appear to merge to form a large opening, said pattern of holes being composed of a center hole and concentric orbits thereabout each formed by a circular series of holes, the dimension of the pattern being larger than that of a normal eye such that if the eyepieces were both in registration with each eye of a user, the outer orbit of holes would be outside the field of vision, and if the eyepieces were off center with respect to the eyes of the user, the outer orbit is then within the field of vision, said pin holes being countersunk to minimize internal reflection and thereby avoid corona effects.

2. A lensless device as set forth in claim 1, wherein said pattern is composed of a center hole and concentric orbits, each formed by a circular series of equispaced holes.

3. A lensless device as set forth in claim 2, further including a circular ridge surrounding the center hole, and circular ridges surrounding each of the hole orbits.

4. A device as set forth in claim 1, wherein the internal walls of said pin holes have a matte finish to further minimize internal reflection and thereby avoid corona effects.

5. A lorgnette as set forth in claim 1 wherein said plate has a transverse score line in the center portion thereof to define a hinge whereby the plate may be folded in half.

* * * * *